United States Patent [19]

Soucemarianadin et al.

[11] Patent Number: 5,086,840
[45] Date of Patent: Feb. 11, 1992

[54] DELAYED RIGID FOAM SYSTEMS AND APPLICATIONS IN PARTICULAR FOR PLUGGING SELECTIVE TREATMENTS IN THE OIL INDUSTRY

[75] Inventors: Arthur Soucemarianadin, Saint-Peray, France; Keng S. Chan, Calgary, Canada

[73] Assignee: Dowell Schlumberger Incorporated, Tulsa, Okla.

[21] Appl. No.: 471,199

[22] Filed: Jan. 26, 1990

[30] Foreign Application Priority Data

Jan. 27, 1989 [FR] France .................................. 89 01147

[51] Int. Cl.⁵ ...................... E21B 33/138; E21B 43/27
[52] U.S. Cl. .................................. 166/294; 166/281; 166/292; 166/300
[58] Field of Search ............... 166/270, 294, 295, 300, 166/309, 281, 292; 523/130, 132; 405/263, 264

[56] References Cited

U.S. PATENT DOCUMENTS

| | | | |
|---|---|---|---|
| 3,603,399 | 9/1971 | Reed | 166/305.1 |
| 3,614,985 | 10/1971 | Richardson | 166/300 X |
| 4,665,986 | 5/1987 | Sandiford | 166/272 X |
| 4,673,038 | 6/1987 | Sandiford et al. | 166/294 X |
| 4,676,318 | 6/1987 | Myers et al. | 166/292 X |
| 4,799,550 | 1/1989 | Harris et al. | 166/300 |
| 4,836,281 | 6/1989 | Robin et al. | 166/309 X |
| 4,842,068 | 6/1989 | Vercaemer et al. | 166/294 X |
| 4,848,465 | 7/1989 | Hazlett | 166/292 X |

*Primary Examiner*—George A. Suchfield
*Attorney, Agent, or Firm*—Stephen A. Littlefield

[57] ABSTRACT

The invention concerns delayed gelation systems which are injected under the shape of a foam in the chosen formations.

The choise of an either oil compatible, or water compatible foaming agent allows obtaining a remarkable process selectivity.

Plugging; acid diversion; water control treatments are carried out.

9 Claims, 2 Drawing Sheets

DELAYED RIGID FOAM SYSTEMS AND APPLICATIONS IN PARTICULAR FOR PLUGGING SELECTIVE TREATMENTS IN THE OIL INDUSTRY

BACKGROUND OF THE INVENTION

The invention concerns delayed gelation systems which can be used in particular for water control processes in the oil industry and, more generally, the selective treatment of formations.

This type of process for some underground formations crossed by injection or production bore holes, is well known in its principle by those skilled in the art, as well as the very difficult problems which it raises. It will be useless to describe those operations here. This invention is concerned with selectively plugging the pores of an underground zone without plugging the oil producing layer.

It was first proposed, in the U.S. Pat. No. 3 614 985, using urea and aluminum chloride to cause a delayed aluminum hydroxide precipitation.

The French patent application no. 85-10272 applied July 2, 1985 proposes using aluminum hydroxychloride which allows accurately controlling the precipitation time, the structure and the morphology of the precipitate.

The French patent application no. 86 06434 applied Apr. 30, 1986 proposes using hexamethylenetetramine and the French patent application no. 86 14089 applied Oct. 8, 1986 recommends the adjunction of an adjuvant for the activator (sodium cyanate).

The teaching of all the above mentioned documents is incorporated here as a reference and those skilled in the art can refer to those.

The above discussed techniques have reached an efficiency and an accuracy which are satisfactory taking into account the extreme difficulty of the technical problem raised.

An object of the invention is to further improve some aspects of these techniques and to substantially reduce their cost which has become an absolutely determining parameter in the oil industry.

One of the major inconveniencies of the water control techniques generally is their very high cost. This is caused by the necessity of using large volumes of fluid to obtain the desired effect. Namely, it is very often necessary to treat the permeable basin over a several meters, possibly several tens of meters, depth and not limit a plugging process to the immediate surroundings of the bore hole.

SUMMARY OF THE INVENTION

According to the invention, it is proposed to present the delayed gelation (or precipitation) systems of the above mentioned type as foamed systems.

It will be possible either to inject liquid systems for in situ foaming at the level of the formation, or to directly surface or bore hole form the foam, and therefore inject the product directly in the form of a foam into the formation.

In the case where the foam is generated in situ, it will preferably be possible first to inject into the formation to be treated a volume of fluid including a foaming agent and the various additives susceptible to cause the gel structure formation with a certain delay (see above mentioned patents). The gas, preferably nitrogen or air or carbon dioxide will then be injected in order to form the foam in the porous medium. When the injected gas volume is satisfactory to realize the desired foam amount, a new fluid volume including the above mentioned additives is injected and the process is repeated until the total volume desired for the process has been injected.

The foams have been used in controlling moving fluid mobility for a steam injection aided production. Their application is also known in hydraulic fracturing. The rheology of the foams and their fluid moving properties in a porous medium have been intensely studied and published. The practical use of those foams in the field also raises no particular problem. A foam is a fine dispersion of a gas in a liquid, generally water or oil based, phase. This foam is generated when surface-active agents or surfactants, also called in this case foaming agents, are added to the liquid phase and when the gas-liquid mixture is formed under heavy turbulence condition.

The foam quality is a qualitative measure of the relative gas quantity, under the pressure and temperature conditions of the basin, as compared to the total foam volume. It clearly appears that the foam quality will have a major influence on the processing cost, for a same total fluid volume.

There however exists no application of the foams in the very particular field of water control, where it was seen that it raises very specific and arduous problems, in particular the necessity of selectively placing the processing fluid, i.e. only into the water zone, of using the least possible fluid quantity, and of opposing for a long period any new water invasion into the oil producing layer.

The invention solves these problems even though a high quality foam paradoxically conveys much less active plugging product than a comparable liquid volume. It seemed impossible to efficiently and durably plug a zone with a much smaller active product quantity than in the previous and the most recent techniques. In addition, it did not seem possible to efficiently control the selective placement of foam into the formation (an essential criterion of success) since this placement already is delicate with the liquid which, by nature, is better controlled than a foam. It also seemed impossible to build up a foam which stands for several hours (necessary gelation time) in the temperature and pressure conditions of a bore hole bottom.

According to the invention, of the placement and the gelation time (or precipitation) with a high precision and a better injectivity, a better selectivity relative to high permeability zones, and a decrease of the risk of processing fluid invading adjacent oil zones are obtained.

It will of course be noted that foams can as well be formed in the bore holes as well with conventional water control techniques, which are based on synthetic polymers, for instance polyacrylamide, or natural polymers or biopolymers, like xanthane gum. But even in the case where those polymeric systems would have a more or less controlled or delayed gelation by a known redox system, the final foam obtained would still be a fluid, the consistency of which will only depend upon the quantity of the polymers used.

When a foam is formed with such a polymer containing solution, the latter rigidify the bubble wall, thus limiting the injectivity of the foam into the porous medium. It will thus be necessary to be able to inject a polymer containing solution or foam into a porous medium, over a satisfactory distance around the bore hole to limit the polymeric concentration to extremely low concentrations.

The fact that polymeric concentrations are very weak and the fact that the continuous foam phase stays liquid, even if it is more or less is viscous, would prevent a practical use of foam with these conventional techniques.

The invention thus consists under one of its aspects, in injecting, or in situ forming, a foam composed of an aqueous phase containing no polymers, formed on the basis of a delayed gelation system as described above.

Another aspect of the invention concerns the choice of the foaming agent or surfactant.

According to the desired process a water resistant (or compatible) surfactant, or an oil resistant (or compatible) surfactant will be chosen.

The foam liquid phase, which during the injection therefore presents a viscosity very close to the viscosity of water, forms after a certain time, which can be adjusted as a function of the formation temperature by the quantities of aluminum hydroxychloride and of the various activators according to this same temperature, a mineral colloidal gel. This mineral gel which is obtained by aluminum precipitation under a colloidal form, will give a rigid structure to the foam.

Thus, as opposed to the traditional polymer containing foams (if the latter could be injected in a homogenous way into the porous medium) there is formed, according to the invention, a rigid foam after a totally controllable time, and without having affected the processing fluid injectivity.

BRIEF DESCRIPTION OF THE DRAWINGS

The invention will now be described in the more limited aspects of preferred embodiments thereof and in conjunction with the accompanying drawings forming a part of this specification and in which.

DETAILED DESCRIPTION OF THE PREFERRED EMBODIMENTS AND THE DRAWINGS

Reference will be made to the tests presented in the French patent application no. 8901146 applied today by the applicant.

Water resistant and non oil resistant surfactant

Under this hypothesis the foam will stay stable, and therefore efficient, in the water formation or zone, and on the opposite will collapse in the oil formation or zone.

Figure 1C:
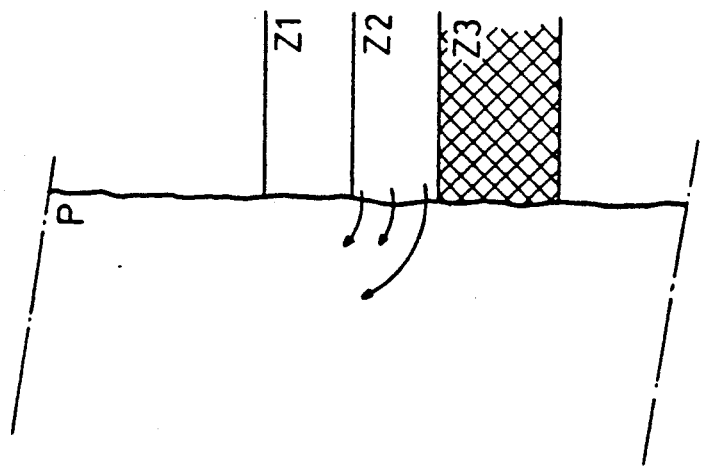
FIGS. 1 a–c illustrate one preferred form of the stepwise plugging treatment process in accordance with the present invention.
Figure 1B:
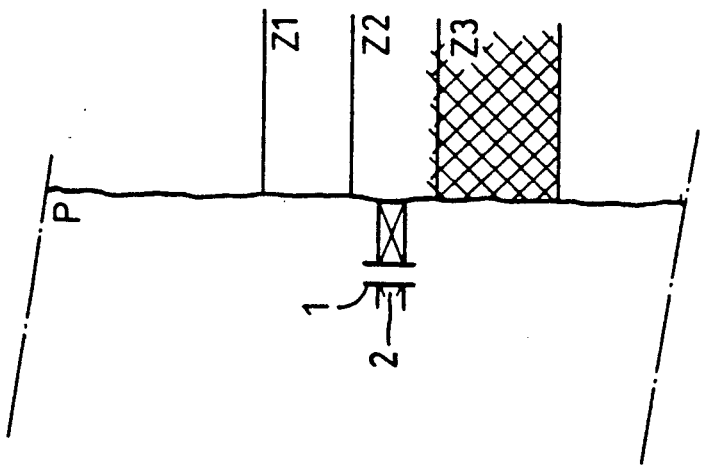
Figure 1A:
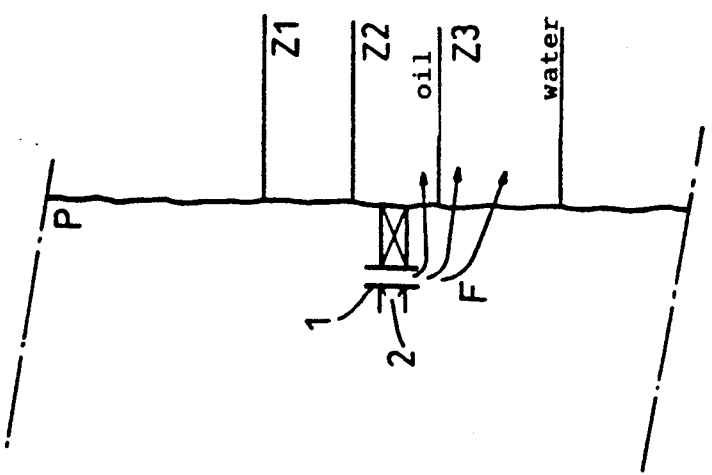

The three steps of such a process are represented in the accompanying FIG. 1 (FIG 1a, 1b, and 1c). The bore hole (P) crosses three zones Z1, Z2 and Z3, Z1 is a water zone, Z2 is an oil producing zone, Z3 can be any formation.

A zone insulation system for instance made up of a packer 2 crossed by a conduit 1 is positioned, substantially at the lower level of the oil zone. The packer 2 can be a inflatable element for coil tubing for instance. The process "fluid" (F) is injected as mentioned above. This is either a foam or the forerunner constituents of a foam. The "fluid" (F) invades the water zone, (which one desires to plug) and the lower part of the oil zone, (where obviously any plugging or permeability reduction should be avoided).

When a sufficient volume of "fluid" (F) has been injected, the injection is stopped and the pressure is maintained ("shut-in") for a time long enough for a foam to start forming, except if a foam has directly been injected—(FIG. 1b) and starts solidifying. When contacting the oil phase (i.e in Z2) the foaming agent degradation will bring the foam degradation.

In Z2, there consequently is no foam formation or the latter is destroyed whereas in Z3 the foam is formed (or stays) and can solidify.

When the well is put into production again (FIG. 1c) the foam constituents existing in the Z2 oil zone are flushed, whereas, to the contrary, the foam stays in Z3 where it completes its solidifying.

There is an obvious interest in positioning the packer 2 as low as possible so as to let as little fluid (F) as possible penetrate into Z2, as well to reduce the process cost as to avoid any interaction risk of fluid (F) with the basin Z2.

However, the interest for invading the lower part of Z2 is that this insures the plugging of the whole water zone.

An inert (protective) fluid can also be injected simultaneously with (F), or before (F), into the producing zone Z2, to prevent penetration of the "fluid" (F) into the oil zone. Reference can be made under this aspect to the French patent application no. 86 18488 applied 31rst December 1986 and no. 87 01345 applied 4th February 1987.

It also is possible not to use a packer 2 when the positioning thereof is not possible. In this case zones Z2 and Z3 will be invaded but Z2 will be flushed of the degraded constituents, the foam (F) when the oil bore hole is producing again.

It can be seen that combining a delayed gelation, foam system with a surfactant or foaming agent which is not oil resistant allows integrally plugging a water zone, over a high interval, without risking damaging the oil basin.

Preferably 0.5 to 5% oil will be incorporated into the system which improves the delayed foam stability. This point can be important since it does matter that the foam under formation is not degraded until it is fully solidified or gelled.

Water resistant or water compatible surfactants and foaming agents are well known by those skilled in the art, as well as their use; let us only mention the cationic surfactants such as the ammonium salts. They are called water soluble and we shall mention the alphaolefinsulphonates and the ethoxylated sulphonates having carbon condensation lower than 16.

The above process also allows realizing a much more efficient diversion during acid treatments of the Z2 matrix. A complete diversion was reached in laboratory (100% acid in Z2).

Oil resistant and non water resistant surfactants

The foam here is stable in the oil zone, and is degraded in the water zone.

Figure 2C:
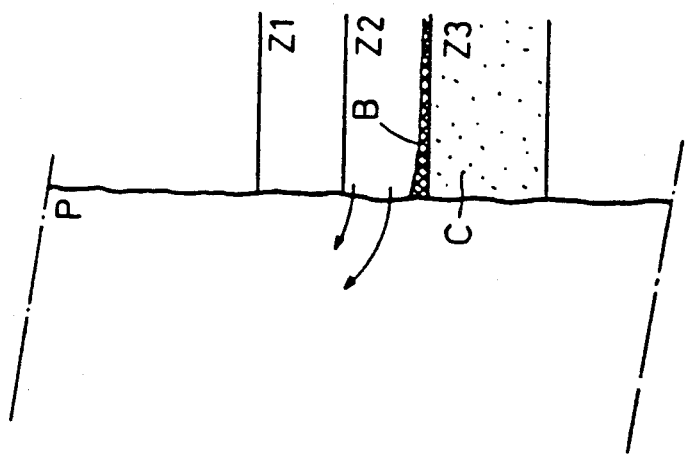
FIGS. 2 a–c illustrates an alternative form of the stepwise plugging treatment process in accordance with the present invention.
Figure 2B:
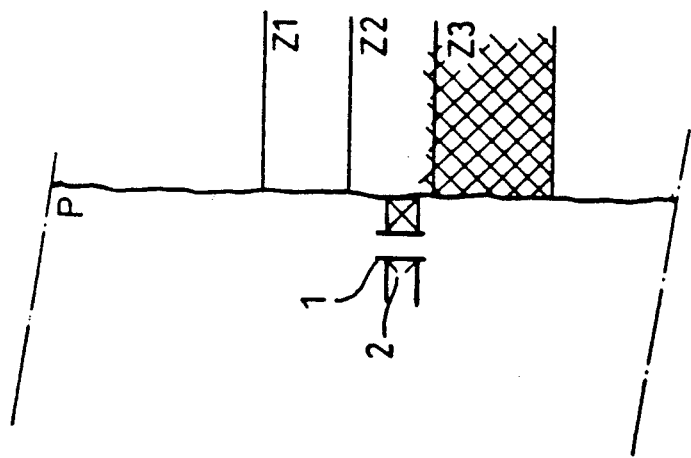
Figure 2A:
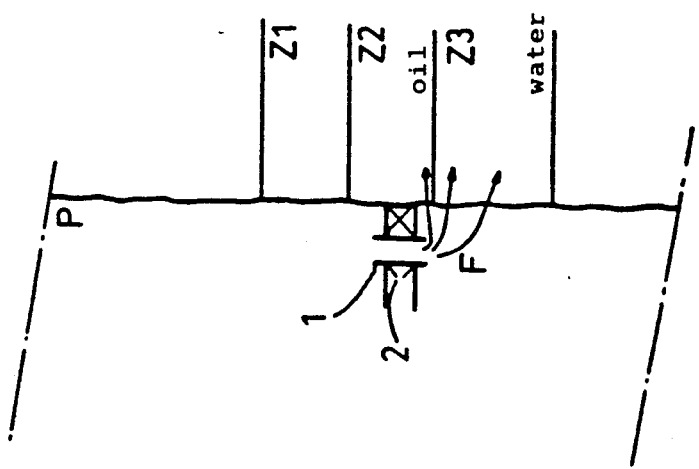

The steps of such a process are represented in the accompanying FIG. 2 (FIG. 2a, 2b, 2c).

In FIG. 1 and FIG. 2 the same references designate the same elements.

The packer (2) is positioned slighly above the interface Z2/Z3 and the "fluid" (F), which, again, can be any forerunner component of the delayed gelation foam or the surface prepared foam itself—(FIG. 2a), is pumped.

The pumping is stopped and the pressure is maintained ("shut in") as in the above example (FIG. 2b) and the bore hole production is started again when the foam is not yet fully solidified (FIG. 2c). In the water zone Z3, the aqueous phase has degraded the surfactant and the foam has collapsed or did not form. Its components (c) stay in Z3, which presents no inconveniences.

To the contrary, the foam contacting the oil phase Z2 formed correctly. The possible foam excess is flushed towards the bore hole whereas a "foam barrier" B stays and is left to solidify.

As indicated above, it may be preferred to incorporate 0.5 to 5% oil into the gelation system to improve the foam stability and its resistance at the aqueous phase contact.

Good oil resistant surfactants, as well as their use are well known to those skilled in the art. The fluorocarbonated surfactants should particularly be noted. Such surfactants or foaming agents are called "water soluble". The alphaolefinsulphonates and the ethoxylated sulphonates having a carbon condensation higher than 16 can also be noted. Those skilled in the art will understand that FIG. 1 and FIG. 2 are idealized and only those elements that relate to the process principle were kept and represented.

An important element, in the considered applications, concerns the fact that the delayed gelation foam must stay statically stable until it has rigidified. It is known that a foam will more easily collapse when in static than in dynamic state.

The foam stability is clearly improved by a preflush of the same foaming agent as the agent used in the foam.

We claim:

1. A method for selectively plugging a subterranean formation comprising the steps of:
   (a) providing a controlled gelation or solidification system comprising an aluminum salt selected from a group consisting of aluminum chloride and aluminum hydroxychloride and a weak base selected from a group consisting of urea and hexamethylenetetramine;
   (b) combining the controlled gelation or solidification system with a gas and a foaming surfactant to form a foam;
   (c) injecting the foam into the formation to be plugged, and
   (d) shutting in the well for a period of time to allow solidification or gelation of the foamed controlled gelation or solidification system within the formation.

2. The method as set forth in claim 1 wherein the step of combining comprises the step of combining a gas and a hydrophilic surfactant and wherein the step of shutting in causes a stable foam to form in a water-bearing formation and foam degradation in an oil-bearing formation.

3. The method as set forth in claim 2 wherein the step of combining comprises combining a gas and a surfactant selected from a group consisting of alpha-olefinsulfonates and ethoxylated sulfonates with a carbon condensation lower than 16.

4. The method as set forth in claim 1 wherein the step of combining comprises combining a gas and a hydrophobic surfactant and the step of shutting in allows the formation of a stable foam in an oil-bearing formation and degradation of foam component in a water-bearing formation.

5. The method as set forth in claim 4 wherein the step of combining comprises combining a gas and a surfactant selected from a group consisting of alpha-olefinsulfonates and ethoxylated sulfonates having a carbon condensation higher than 16.

6. The method as set forth in claim 1 wherein the step of combining is carried out prior to the step of injecting.

7. The method as set forth in claim 1 wherein the step of combining comprises the step of injecting the gas and surfactant subsequent to the step of injecting the controlled gelation or solidification system.

8. The method as set forth in claim 1 wherein the step of combining comprises combining a gas and a foaming surfactant further including 0.5 to 5% oil.

9. The method as set forth in claim 1 wherein the step of providing comprises providing a controlled gelation or solidification system comprising an aluminum salt selected from a group consisting of aluminum chloride and aluminum hydroxychloride, a weak base selected from a group consisting of urea and hexamethylenetetramine and further including a sodium cyanate activator.

* * * * *